United States Patent
Dodson

(10) Patent No.: US 7,998,421 B2
(45) Date of Patent: Aug. 16, 2011

(54) PARTICLE TREATMENT IN AN EXPANDED TOROIDAL BED REACTOR

(75) Inventor: Christopher Edward Dodson, Berkshire (GB)

(73) Assignee: Mortimer Technology Holdings Limited, London (GB)

( * ) Notice: Subject to any disclaimer, the term of this patent is extended or adjusted under 35 U.S.C. 154(b) by 808 days.

(21) Appl. No.: 11/663,631

(22) PCT Filed: Sep. 23, 2005

(86) PCT No.: PCT/GB2005/003695
§ 371 (c)(1),
(2), (4) Date: Jan. 24, 2008

(87) PCT Pub. No.: WO2006/032919
PCT Pub. Date: Mar. 30, 2006

(65) Prior Publication Data
US 2008/0286164 A1    Nov. 20, 2008

(30) Foreign Application Priority Data
Sep. 24, 2004    (GB) .................................. 0421362.5

(51) Int. Cl.
*B01J 8/18* (2006.01)
*B01F 5/12* (2006.01)
*F26B 3/08* (2006.01)

(52) U.S. Cl. ........ 422/139; 422/144; 422/215; 366/263; 34/326; 34/359; 34/360

(58) Field of Classification Search .................. 422/139, 422/144, 215; 366/263; 34/326, 359, 360
See application file for complete search history.

(56) References Cited

U.S. PATENT DOCUMENTS

| 2,703,275 | A | | 3/1955 | Martin et al. |
| 4,106,892 | A | * | 8/1978 | Haga et al. ........................ 432/58 |
| 4,308,806 | A | * | 1/1982 | Uemura et al. ................ 110/244 |
| 4,532,155 | A | | 7/1985 | Golant et al. |
| 4,668,441 | A | | 5/1987 | Hess et al. |
| 5,024,684 | A | | 6/1991 | Tank et al. |
| 2002/0081247 | A1 | * | 6/2002 | Dodson ........................ 422/187 |

(Continued)

FOREIGN PATENT DOCUMENTS
DE    21 06 941 A1    8/1972
(Continued)

OTHER PUBLICATIONS

Communication under Rule 71(3) EPC about intention to grant a European patent.

(Continued)

*Primary Examiner* — Walter D Griffin
*Assistant Examiner* — Lessanework Seifu
(74) *Attorney, Agent, or Firm* — Bacon & Thomas, PLLC

(57) ABSTRACT

A method of processing a fluid and/or a particulate material, the method comprising the steps of: (a) introducing the particulate material into a chamber; (b) providing a flow of fluid into said chamber for entraining the particulate material; and (c) removing processed fluid and/or particulate material from the chamber; wherein the chamber comprises a processing zone having a substantially circular transverse cross-section, the fluid flow being introduced into the processing zone at an angle of between 10° and 75° with respect to a tangent of the substantially circular transverse cross-section of the processing zone to establish a fluid flow following a substantially helical path in the processing chamber.

14 Claims, 4 Drawing Sheets

U.S. PATENT DOCUMENTS

2005/0120583 A1    6/2005    Huttlin

FOREIGN PATENT DOCUMENTS

| | | |
|---|---|---|
| DE | 3245393 | 6/1984 |
| EP | 0 513 563 A1 | 4/1992 |
| GB | 2 177 616 A | 7/1985 |
| SU | 1169724 A1 | 7/1985 |
| WO | WO 00/16891 A | 3/2000 |

OTHER PUBLICATIONS

Reply from Boult Wade Tennant dated Jan. 30, 2009 Regarding European Patent Application No. 05785177.6-2104.

Communication pursuant to Article 94(3) EPC, European Examination Report of Sep. 23, 2008.

Reply from Boult Wade Tennant dated Jan. 16, 2008 Regarding European Patent Application 05 785 177.6-2104.

Communication pursuant to Article 96(2) EPC, European Examination Report of Jul. 24, 2007.

International Preliminary Report on Patentability for PCT/GB2005/003695.

Reply form Boult Wade Tennat dated Jan. 4, 2007 Regarding Demand for Examination.

International Search Report for B01J8/24.

Search Report under Section 17, Regarding GB 0421362.5 priority application.

* cited by examiner

PARTICLE TREATMENT IN AN EXPANDED TOROIDAL BED REACTOR

The present application relates to a method of processing a particulate material. The present application also relates to apparatus for processing a particulate material.

Treatment of particulate material commonly uses a fluid stream and more particularly a gaseous stream. The particulate material may function as a catalyst, absorption medium or as a source of reactants which react with or are treated by the fluid stream. It has been thought for some time that the best mode for treating beds of particulate material is to fluidise the bed with a gaseous stream.

European patent No. 0382769 describes an annular processing zone for a circumferentially circulating turbulent bed of material. The system is commonly sold under the trade name TORBED™ and has been used in a variety of particulate treatment applications such as metal ore treatment and roasting; catalyst and catalytic particle treatment; drying of a particulate matter; reacting particles with the gaseous streams; combustion, gasification/pyrolysis of gases and/or solids; tablet coating; coffee bean roasting and the like.

A method and apparatus for processing matter in a turbulent mass of particulate material is further known from EP0068853. This application discloses a processing chamber into which a hot gas is introduced in a generally tangential manner. The hot gas thereafter tends to follow the interior of the wall of the processing chamber. A particulate material is supplied into the chamber and under the influence of the hot gas is displaced to the wall of the chamber and is caused to flow in a turbulent manner. Perlite is added to the processing chamber and expands as it is heated. The hot gas and expanded perlite are exhausted from the processing chamber together.

Apparatus and a method of producing ash are known from International patent application No. PCT/CA01/01852. The apparatus comprises a housing into which a feed material is introduced through a feed tube. Gas is introduced through an inlet pipe provided at the base of the cylindrical housing. The gas passes through an annular guide consisting of a series of spaced blades arranged to cause the gas to leave the guide in the form of an inner vortex. This inner vortex moves vertically through a mixing zone provided in the housing. An outer vortex is created by gas supplied from a second gas inlet provided at the top of the cylindrical housing.

A further process for processing particulate material is known from U.S. Pat. No. 6,108,935. This process introduces a circumferentially directed flow of fluid into an annular processing zone to develop a circulating turbulent bed of particles.

The inventors in the present case have recognised the desirability of establishing a processing zone which provides for a predictable particle flow path, both circumferentially and helically, in the processing zone to ensure more uniform particle treatment and gas/solid mixing for a given residence time. The present invention, at least in preferred embodiments, attempts to provide at least some of this functionality.

Viewed from a first aspect, the present invention provides a method of processing a fluid and/or a particulate material comprising the steps of:
(a) introducing particulate material into a chamber;
(b) providing a flow of fluid into said chamber for entraining the particulate material; and
(c) removing processed fluid and/or particulate material from the chamber;
wherein the chamber comprises a processing zone having a substantially circular transverse cross-section, the fluid flow being introduced into the processing zone at an angle of between 10° and 75° with respect to a tangent of the substantially circular transverse cross-section of the processing zone to establish a fluid flow following a substantially helical path in the processing zone.

It has been recognised that the introduction of the fluid flow into the processing zone within the above-referenced parameters is particularly suitable for establishing a uniform particle flow path. Thus, uniform particle treatment and gas/solid mixing may be achieved.

The processed particulate material and/or fluid may, for example, be removed at predetermined time intervals.

The particulate material and fluid are in contact with each other in the processing zone.

The fluid flow upon entry into the processing zone may define an angle of between 20° and 60°; or between 30° and 45° with respect to said tangent.

The fluid flow upon entry into the processing zone is preferably inclined upwardly at an angle between 5° and 45°; between 10° and 40°; between 15° and 35°; or between 20° and 30° with respect to a horizontal plane.

The velocity of the fluid flow is preferably controlled so as to be greater than the terminal velocity of particulate material in the chamber.

The direction of the fluid flow may be developed by at least one nozzle or tube. Alternatively, the direction of the fluid flow is developed by at least one vane or deflector. Preferably, however, a plurality of vanes, deflectors or tubes are employed.

The fluid flow in the chamber preferably causes the particulate material to undergo both vertical and horizontal displacement. Thus, the mixing of the particulate material with the fluid may be maximised within the chamber.

Although the processing zone may be defined by the walls of the chamber, it is preferably formed by fluid flow in a central region of the chamber to allow particulate material to exit the processing zone and be deposited radially outwardly of the processing zone. The deposited particulate material preferably forms a flowing bed. The chamber preferably has a base inclined downwardly towards the centre of the chamber to bias particulate material in the flowing bed back towards the processing zone.

The processing zone is preferably annular or toroidal in shape. This may be achieved by providing a central conduit or pillar in the chamber, but is preferably implemented by the helical movement of the fluid flow inside the chamber.

Although the fluid may be introduced into the side or the top of the processing zone, it is preferably introduced at the base thereof.

Although in certain arrangements it may be desirable for the fluid to be a liquid, it is more usually a gas.

The helical fluid flow is preferably either conical or cylindrical.

The present application further relates to apparatus for processing a fluid and/or a particulate material, the apparatus comprising a chamber, means for introducing particulate material into the chamber, and at least one fluid inlet for introducing a flow of fluid into the chamber; wherein the chamber comprises a processing zone having a substantially circular transverse cross-section, and the at least one fluid inlet being adapted, in use, to introduce the fluid flow into the processing zone at an angle of between 10° and 75° with respect to a tangent of the substantially circular transverse cross-section of the processing zone.

The fluid inlet is preferably adapted to introduce the fluid flow into the processing zone at an angle between 5° and 45°;

between 10° and 40°; between 15° and 35°; or between 20° and 30° with respect to a horizontal plane.

The apparatus may further comprise a flow controller suitable for controlling the velocity of the fluid introduced into the chamber.

The apparatus preferably comprises at least one vane and/or at least one deflector for controlling the flow of the fluid as it is introduced into the chamber. Alternatively, or additionally, the apparatus may comprise at least one nozzle for determining the direction of the fluid flow as it is introduced into the chamber.

The chamber preferably has a base inclined downwardly towards the centre thereof. This arrangement advantageously causes a flowing bed to be formed at the base of the chamber when the apparatus is in use.

The at least one fluid inlet is preferably arranged such that the processing zone is formed in a central region of the chamber. The at least one fluid inlet may be provided in a side portion or a top portion of the chamber, but it is preferably provided at the bottom thereof.

Viewed from a further aspect, the present application relates to an assembly for directing a flow of fluid into a processing zone of a processor, the assembly having a plurality of channels for guiding the flow of fluid through a plurality of openings to an interior of the assembly, each of the channels being arranged, in use, to direct the flow of fluid into the processing zone at an angle less than 90° relative to a radial line extending from a longitudinal axis of the assembly to the respective opening.

The assembly preferably comprises a plurality of guide members and at least one of said channels is preferably provided in each of said guide members. Although the channels may be defined by holes extending through the guide member, the channels may also be formed as recesses or slots in a surface thereof.

The guide members may be fixedly mounted in a frame, such that the frame determines the orientation of each guide member. Each of the guide members may be provided with an alignment surface for abutment against an adjacent like guide member. The alignment surfaces preferably determine the orientation of each guide member relative to said adjacent guide member. The alignment surface may thereby determine the orientation of the at least one channel formed in each guide member and, thus, determine the direction of the flow of fluid relative to said radial line.

The channels are preferably arranged, in use, to direct the flow of fluid at an angle between 15° and 80°; or between 30° and 70° relative to said radial line.

The channels are preferably arranged, in use, also to direct the flow of fluid at an angle inclined relative to a plane perpendicular to the longitudinal axis of the assembly. The flow of fluid, in use, will be inclined at an angle between 5° and 45°; 10° and 40°; 15° and 35°; or between 20° and 30° relative to said plane.

The guide members may be arranged in an oval or elliptical arrangement about said longitudinal axis. Preferably, however, the guide members are arranged in a substantially circular arrangement such that the openings are all equal distant to the longitudinal axis of the assembly.

Viewed from a still further aspect, the present application relates to an assembly for directing a flow of fluid into a processor, the assembly having a longitudinal axis and comprising a plurality of guide members each having at least one channel formed therein; wherein each channel is arranged, in use, to guide the flow of fluid through a respective opening provided in the guide member to an interior of the assembly at an angle relative to a plane perpendicular to the longitudinal axis of the assembly. The guide members are preferably formed separately.

The flow of fluid, in use, will preferably be inclined at an angle between 5° and 45°; 10° and 40°; 15° and 35°; or between 20° and 30° relative to said plane. The channels are preferably all inclined at substantially the same angle to said plane.

The channels are preferably arranged, in use, also to direct the flow of fluid at an angle less than 90° relative to a radial line extending from a longitudinal axis of the assembly to the respective opening. The channels are preferably arranged, in use, to direct the flow of fluid at an angle between 15° and 80°; between 30° and 70°; or between 45° and 60° relative to said radial line.

The guide members may be arranged about said longitudinal axis to form an oval or elliptical arrangement. Preferably, however, the guide members are arranged substantially to form a circle (i.e. with the openings all displaced at equal distances from the longitudinal axis of the assembly).

Although the channels may be holes formed through the guide members, they are preferably slots or recesses formed in a surface thereof.

The present application further relates to a particulate material processor comprising an assembly as described herein.

Viewed from a yet still further aspect, the present application relates to a guide member for directing a flow of fluid into a processor, wherein the guide member has at least one passage formed therein and an alignment surface for abutment against an adjacent like guide member; wherein said alignment surface is adapted to orient the at least one passage in a predetermined orientation relative to the at least one passage in said adjacent like guide member when said alignment surface abuts said adjacent guide member.

Viewed from a still further aspect, the present invention provides a method of processing a fluid and/or a particulate material, the method comprising the steps of: (a) introducing the particulate material to be processed into a chamber; (b) providing a flow of fluid into said chamber for entraining the particulate material; and (c) removing processed fluid and/or particulate material from the chamber; wherein the chamber comprises a processing zone, the fluid flow being introduced through at least one inlet into said processing zone at an angle between 15° and 80° relative to a radial line extending from a longitudinal axis of the chamber to the respective inlet.

Viewed from a yet further aspect, the present invention provides apparatus for processing a fluid and/or a particulate material, the apparatus comprising a chamber, a device for introducing particulate material into the chamber, and at least one fluid inlet for introducing a flow of fluid into the chamber; wherein the chamber comprises a processing zone and the at least one fluid inlet is adapted, in use, to introduce the fluid flow into the processing zone at an angle between 15° and 80° relative to a radial line extending from a longitudinal axis of the chamber to the respective inlet.

According to a further aspect of the present invention, there is provided a process for processing a fluid and/or a particulate material with a stream of fluid in an annular processing zone:

supplying the particulate material for processing in the zone;

discharging processed particulate material from the processing zone;

generating in the zone a circumferentially directed flow of fluid to develop a circumferentially circulating turbulent bed of material within the processing zone;

an improved processing zone in which particulate material is circulated in a controlled manner to provide a predictable particle flow path both circumferentially of the processing zone and helically of the zone, the improvement comprising:
  i) directing the flow of fluid to entrain particulate material such that the resulting direction of flow is:
    a. between an angle of 5° and 45° with respect to the horizontal plane, more particularly between 20° and 30°, and
    b. between an angle of 10° and 75°, more particularly between 20° and 60°, at the point of entry into the process zone with respect to the tangent to the radius from the centre of a substantially circular process zone;
  ii) controlling fluid velocity so that it is greater than the terminal velocity of particles at point of impact on the bed base.

According to a still further aspect of the invention, there is provided an apparatus for processing a fluid and/or a particulate material with a stream of fluid in an annular processing zone, said apparatus comprises:
  means defining an annular processing zone with a fluid inlet means beneath the zone;
  said fluid inlet including means for directing circumferentially process fluid around the annular treatment zone;
  means for admitting particulate material to be processed into the processing zone;
  means for discharging processed particulate material from the processing zone;
  the means for defining said processing zone being configured to maintain a circumferentially circulating turbulent band within the processing zone in response to fluid flow therein;
  an improved processing zone in which particulate material is circulated in a controlled manner to provide a predictable particle flow path both circumferentially of the processing zone and helically of the zone, the improvement comprising:
    ii) directing the flow of fluid to entrain particulate material such that the resulting direction of flow is:
      a. between an angle of 5° and 45° with respect to the horizontal plane, more particularly between 20° and 30°, and
      b. between an angle of 10° and 75°, more particularly between 20° and 60°, at the point of entry into the process zone with respect to the tangent to the radius from the centre of the substantially circular process zone;
    ii) controlling fluid velocity so that it is greater than the terminal velocity of particles at point of impact on the bed base.

It will be appreciated that the fluid flow in the processing zone may be clockwise or anticlockwise. The orientation of the guide members determining the flow direction.

A preferred embodiment of the present invention will now be described, by way of example only, with reference to the accompanying drawings, in which.

Figure 1:
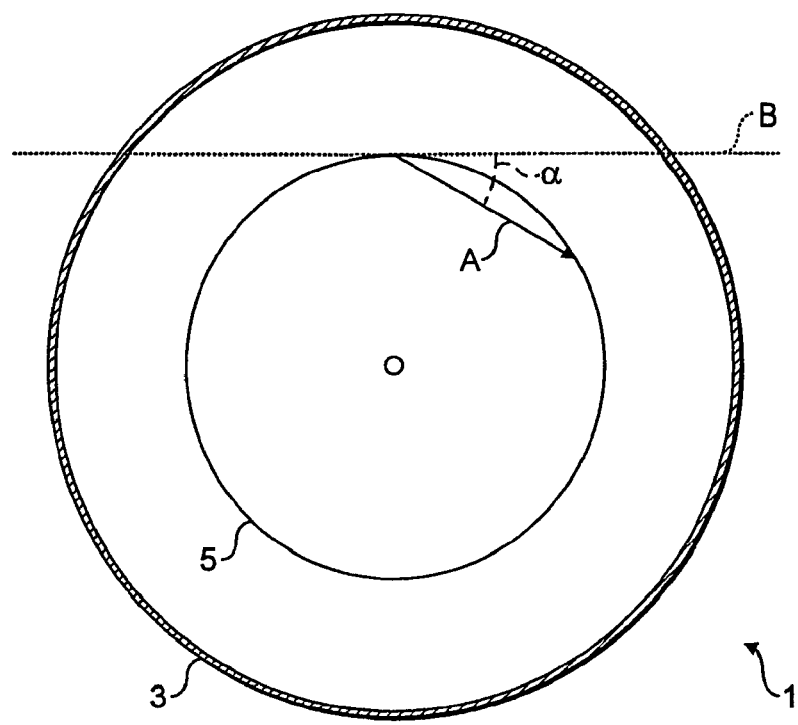
FIG. 1 is a transverse cross-sectional view of a particulate material reactor in accordance with the present invention.

A cross-sectional view of a toroidal bed reactor (1) in accordance with a preferred embodiment of the present invention is shown in FIG. 1. The reactor (1) comprises a cylindrical housing (3) inside of which a processing zone (5) is formed. The processing zone (5) is annular in shape and extends co-axially with the housing (3).

Figure 2:
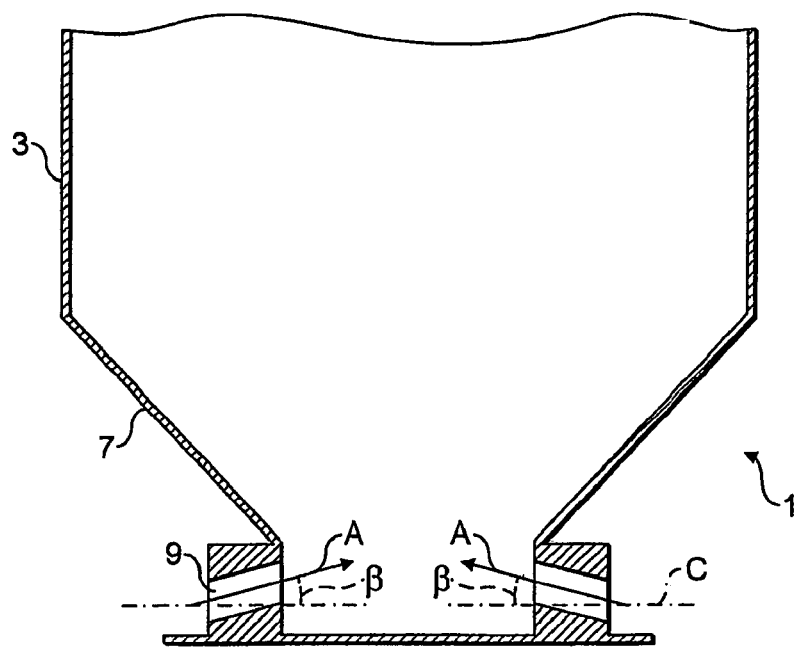
FIG. 2 is a longitudinal cross-sectional view a lower portion of the reactor shown in FIG. 1.

A cross-sectional view of the lower portion of the reactor (1) is shown in FIG. 2. A tapered section (7) is provided at the base of the housing (3). The tapered section (7) is inclined downwardly towards the centre of the reactor (1). Gas is introduced into the reactor (1) through a series of vanes (9) provided at the base of the tapered section (7). The vanes (9) establish a desired fluid flow path (A) within the housing (3).

The vanes (9) direct the gas flow so that it enters the processing zone (5) at an angle α with respect to a tangent (B) of the substantially circular transverse cross-section of the processing zone, as shown in FIG. 1. The angle α is approximately 30° in this embodiment.

The advantage of directing the gas flow inwardly at an angle α is that there is an increased mixing of the gas flow. This provides for a uniform distribution of particulate matter as will be described below. A gas flow which is introduced along a tangent of the processing zone (angle α=0°) will produce less mixing of the gas flow, and so will provide a less uniform distribution of particulate matter.

Furthermore, the vanes (9) cause the gas to enter the processing zone at an angle β inclined upwardly with respect to a horizontal plane (C), as shown in FIG. 2. The angle β is approximately 15° in this embodiment.

The path followed by particulate material (11) introduced into the reactor (1) will now be described for different gas flow paths with reference to FIGS. 3 and 4.

Figure 3:
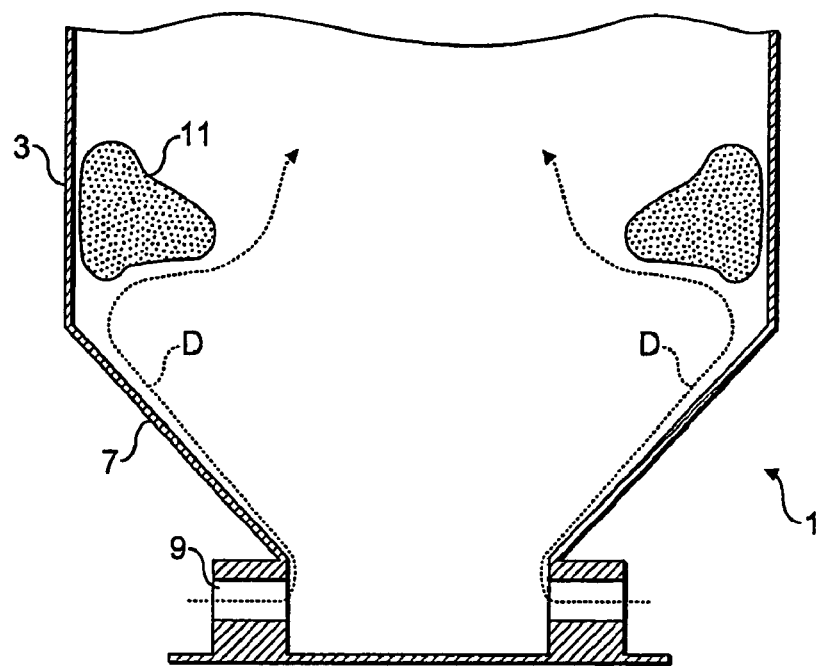
FIG. 3 illustrates the flow path of fluid and particles in a reactor without the benefit of the present invention.

FIG. 3 shows a gas flow path (D) inside the reactor (1) when the gas enters the base of the housing (3) in a radial direction (i.e. α is 90°, and β is 0°). The gas tends to travel up the inside of the tapered section (7) and causes the particulate material (11) to collect in an annular region (9) around the inside wall of the housing (3). The gas travels towards the centre of the housing (3), around the base of the annular region (9), and up towards the top of the housing (3). Thus, the particulate material (11) comes into limited contact with the gas as it travels through the reactor (1).

Figure 4:
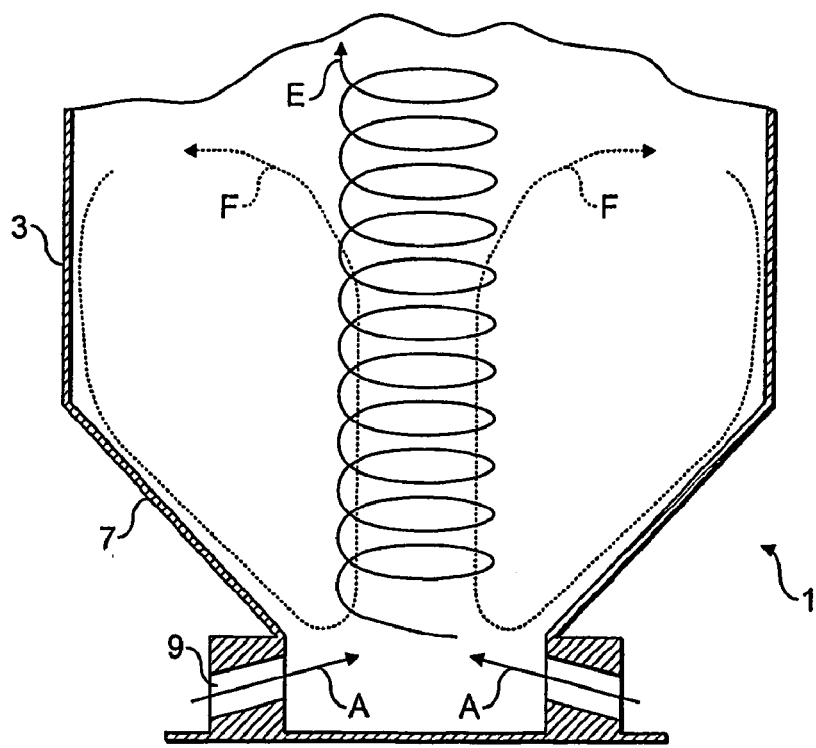
FIG. 4 illustrates the flow path of fluid and particles in a reactor employing the present invention.

In contrast, when the gas is introduced into the reactor (1) in accordance with the present invention (e.g. α is 30° and β is 15°), it follows a helical flow path (E), as shown in FIG. 4. The processing zone (5) is defined by the helical flow of the gas in the housing (3). The particulate material is entrained in the vortex formed by the gas in the processing zone (5) and is transported vertically before being progressively separated from the fluid stream due to centrifugal force. By this means, the processing zone (5) utilising the present invention contains a rapidly and uniformly circulating mass of particulate material evenly distributed in the processing zone (5). A path (F) followed by the particulate material (11) introduced into the reactor (1) is shown in FIG. 4.

The even distribution of particles in the fluid flow is important to help prevent undesirable effects that may occur when the gas follows the flow path (D) shown in FIG. 3. For example, when combusting particulates in air where the control of the temperature achieved by the particulate material needs to be carefully controlled, the aggregation experienced with the flow patterns shown in FIG. 3 causes ash sintering. This sintering occurs because the combusting particles are not entrained and dispersed in the fluid inlet, in this case air or oxygen, and as a result are not cooled to remove the heat being released. This lack of cooling allows the temperature of the combusting particles to exceed that at which they become molten and aggregate. In such a situation, the form of the ash may be hazardous to health, as is experienced with rice husk ash when overheated and forms crystalline silica, as described in PCT/CA01/01852.

As shown in FIG. 4, the particulate material (11) is displaced upwardly by the fluid flow in the processing zone (5) and then expelled radially outwardly. The particulate material (11) then falls to the base of the housing (3) and a moving bed of particulate material is formed by the tapered portion (7) of the reactor (1). The moving bed returns the particulate material to the processing zone (5) under the action of gravity. The cycle is thereby repeated. This cyclical motion of the particulate material allows the reaction in the reactor (1) to be carefully controlled.

The velocity of the gas entering into the processing zone (5) is advantageously controlled to ensure that it is greater than the terminal velocity of the particulate material. This control of the fluid flow helps to reduce or prevent the collection of particulate material at the base of the reactor (1).

It has been found that if the angle β of entry of the gas into the processing zone is 10° or more above a horizontal plane, and it is inclined at an angle α of 10° or more relative to a tangent to a radial line at the point of entry, the fluid and particulate material follow the fluid path illustrated in FIG. 4. The mass of particulate material is suspended in a coherent rotating mass with particles aggregated without incipient fluidisation.

Figure 5A:
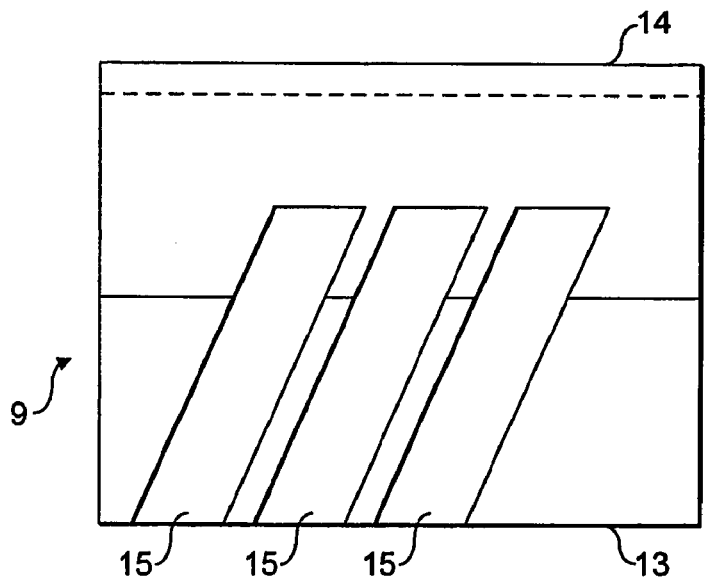
FIGS. 5A, 5B and 5C show bottom, front and end views respectively of angled vanes provided at the base of the processing zone to direct the flow of fluid as it enters the processing zone.
Figure 5B:
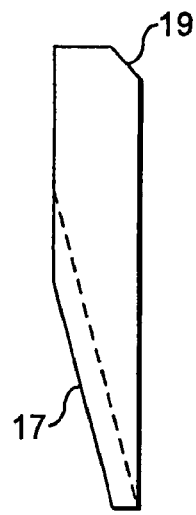
Figure 5C:
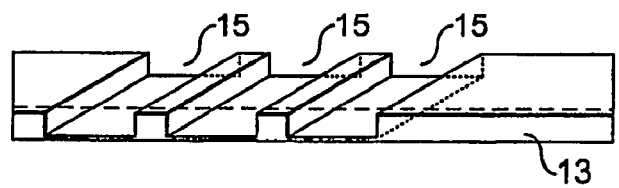

The arrangement of the vanes (9) at the base of the reactor (1) will now be described in greater detail. A single vane (9) is shown in FIGS. 5A, 5B and 5C. The vanes (9) each have a leading edge (13), a trailing edge (14) and three slots (15) formed in the surface thereof. As shown in FIG. 5B, the vanes (9) are tapered towards the leading edge (13) to form a tapered region (17) which serves to align the vanes (9) relative to each other. The slots (15) each extend from the leading edge (13) in a transverse direction across the tapered region (17). A chamfered region (19) is provided at the trailing edge of each vane (9), diametrically opposed from the tapered region (17). A front view of a vane (9) is shown in FIG. 5C.

The slots (15) extend at an angle β relative to a reference axis perpendicular to the leading edge (13) of the vane (9), as shown in FIGS. 5A and 5C. The angular offset of the slots (15) causes the gas to be introduced into the reactor (1) upwardly, at said angle β, relative to a horizontal plane, as described above.

Figure 6A:
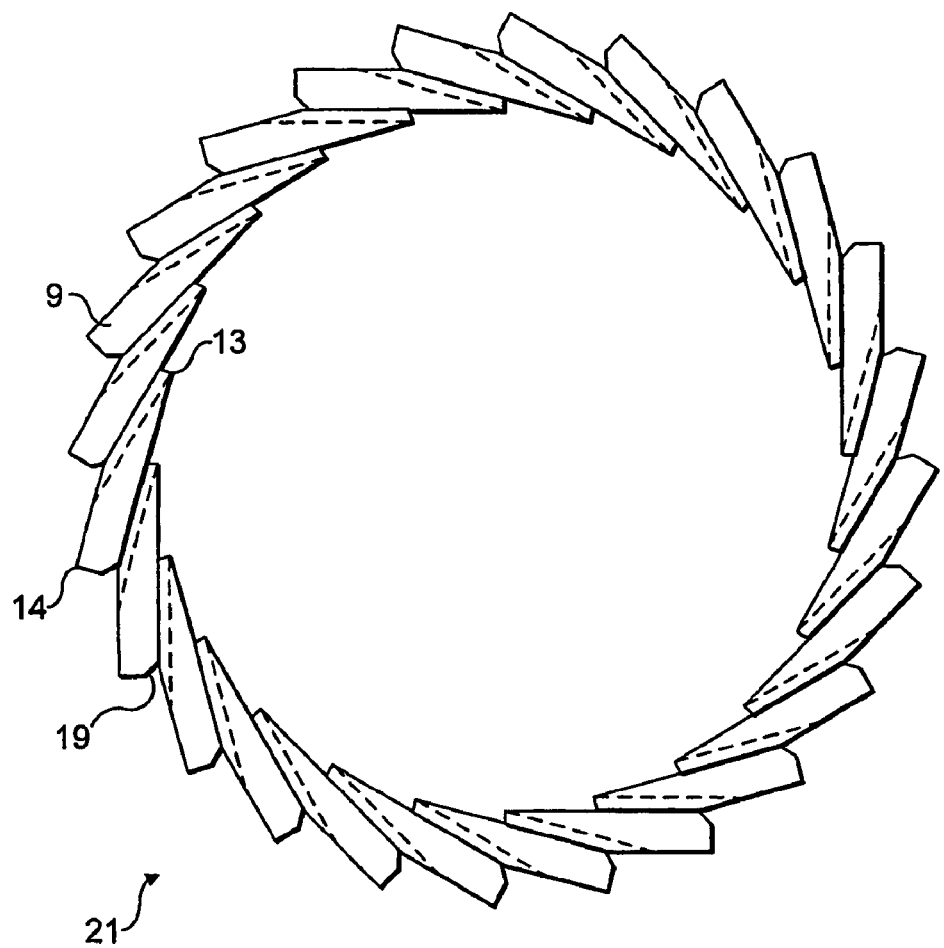
FIGS. 6A and 6B are top and side views respectively of an assembly of the vanes shown in FIG. 5.
Figure 6B:
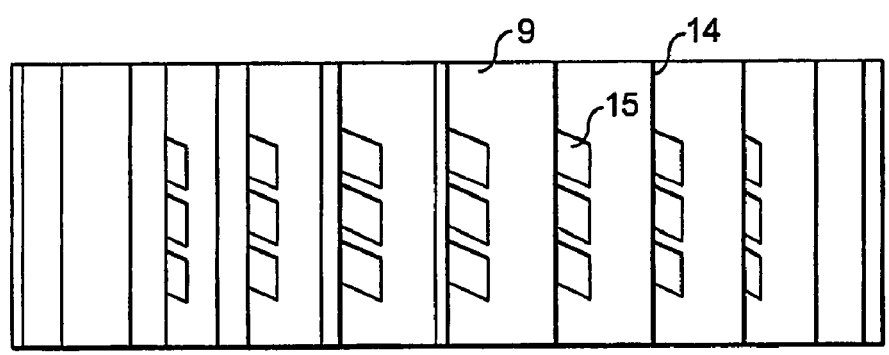

A top view of the vanes (9) arranged in an assembly (21) ready for use is shown in FIG. 6A. A side view of the assembly (21) is shown in FIG. 6B. The tapered region (17) of each of the vanes (9) determines the angular orientation of the vanes relative to each other and, thereby, the angular orientation of the slots (15). Thus, the taper angle of the tapered region (17) defines the angle α at which the gas is introduced into the processing zone (5).

The processing zone (5) is generally annular in shape because of the helical fluid flow inside the housing (3).

By controlling the angle of entry of the fluid into the processing zone to maintain it larger than 10° but less than 75° relative to the tangent to the radial line at the point of entry; and to be greater than 5° but less than 45° relative to said horizontal plane, as shown in FIGS. 1 and 2 respectively, the fluid and particulate flows can be made to circulate along a helical path, as shown in FIG. 4.

The circulating particles are accelerated by the gas flow in the processing zone (5) in both horizontal and vertical directions to travel tangentially of said circumferential flow until such accelerated particles lose their energy and settle into the flowing bed arranged circumferentially of the processing zone (5). By displacement in the flowing bed, the circulating particles are returned to the base of the processing zone (5) thereby ensuring that all of the particles in the bed are exposed to the processing gases to provide for uniform and rapid processing of said particles.

The present invention may further be understood as relating to a process for processing particulate material with a stream of fluid in an annular processing zone. The process includes the steps of supplying the particulate material for processing into the processing zone, discharging processed material from the zone and generating in the processing zone a circumferentially directed flow of fluid to develop a circulating turbulent band of particles. The present invention advantageously provides a predictable particle flow path both circumferentially and helically, within the processing zone. The process preferably comprises directing the flow of fluid to develop a circulating bed, a flow of fluid directed at an angle relative to the tangent to the radial line to the point of fluid and to the horizontal plane at entry into the processing zone base. The process may also comprise controlling fluid velocity so that it is greater than the terminal velocity of larger particles at their point of impact on the bed base and less than the terminal velocity of smaller particles in the superficial space above the bed upper surface.

The toroidal bed reactor of the present invention may be used to process minerals such as kaolin, lime or silicates; soils; carbon; alumina for dry scrubbing; biomass such as wood or rice husks; or sewage sludge.

The gas introduced into the reactor of the present invention may, for example, be air, steam, carbon monoxide or nitrogen. Of course, neutral, oxidizing or reducing gases may be used depending on the process.

Although the embodiment described herein has been directed to a method of processing a particulate material, it will be appreciated that the process and apparatus may equally be employed to process a fluid, such as a gas.

In accordance with this invention, at least in preferred embodiments, an improvement is provided in respect of the system for developing an annular processing bed to achieve controlled predictable movement of particles within the circulating bed.

Although preferred embodiments of the invention have been described herein in detail, it will be understood by those skilled in the art that variations may be made thereto without departing from the scope of the invention or of the appended claims.

The invention claimed is:

1. A method of processing a fluid and/or a particulate material, the method comprising the steps of:
   (a) introducing the particulate material into a chamber;
   (b) providing a flow of fluid into said chamber for entraining the particulate material; and
   (c) removing processed fluid and/or particulate material from the chamber;
   wherein the chamber comprises a processing zone having a substantially circular transverse cross-section, the fluid flow being introduced into the processing zone at an angle of between 10° and 75° with respect to a tangent of the substantially circular transverse cross-section of the processing zone to establish a fluid flow following a substantially helical path in the processing chamber;

wherein said processing zone is provided in a central region of said chamber and individual particulate material exits the processing zone in a radially outward direction; and the exited particulate material circulates to a base of the chamber and returns to the processing zone in a repeated cycle.

2. A method as claimed in claim 1, wherein the velocity of the fluid flow is controlled so as to be greater than the terminal velocity of individual or a mass of particulate material in the chamber.

3. A method as claimed in claim 1, wherein the fluid flow upon entry into the processing zone defines an angle of between 20° and 60° with respect to a tangent of the substantially circular transverse cross-section of the processing zone.

4. A method as claimed in claims 1, wherein the fluid flow upon entry into the processing zone is inclined upwardly at an angle between 5° and 45° with respect to a horizontal plane.

5. A method as claimed in claim 1, wherein said fluid flow is developed by at least one vane or deflector.

6. A method as claimed in claim 1, wherein said fluid flow is developed by at least one nozzle.

7. A method as claimed in claim 1, wherein said fluid flow causes said particulate material to undergo vertical and horizontal displacement.

8. A method as claimed in claim 1, wherein the chamber has a base inclined downwardly towards the centre of the chamber to bias particulate material towards the processing zone.

9. A method as claimed in claim 1, wherein the processing zone is annular in shape.

10. A method as claimed in claim 1, wherein the fluid is introduced at the base of the processing zone.

11. A method as claimed in claim 1, wherein the fluid is a gas.

12. A method as claimed in claim 1, wherein the helical fluid flow is conical or cylindrical.

13. A method as claimed in claim 1, wherein the particle exhibits a uniform particle flow path.

14. A method as claimed in claim 13, wherein the processed particle and/or fluid is removed at predetermined time intervals.

\* \* \* \* \*